(12) United States Patent
Campi et al.

(10) Patent No.: US 8,910,103 B2
(45) Date of Patent: Dec. 9, 2014

(54) METHOD OF DESIGNING A HIGH PERFORMANCE APPLICATION SPECIFIC INTEGRATED CIRCUIT ACCELERATOR

(75) Inventors: Fabio Campi, Zola Predosa (IT); Claudio Mucci, Bologna (IT); Stefano Pucillo, Robbiate (IT); Luca Ciccarelli, Rimini (IT); Valentina Nardone, Monza (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 834 days.

(21) Appl. No.: 12/648,099

(22) Filed: Dec. 28, 2009

(65) Prior Publication Data

US 2010/0169857 A1  Jul. 1, 2010

(30) Foreign Application Priority Data

Dec. 29, 2008  (IT) .............................. MI2008A2337

(51) Int. Cl.
  *G06F 17/50*  (2006.01)
  *G06F 15/76*  (2006.01)
  *G06F 9/30*   (2006.01)

(52) U.S. Cl.
  CPC ........ *G06F 17/5068* (2013.01); *G06F 2217/64* (2013.01)
  USPC ........... 716/121; 716/116; 716/118; 716/119; 716/126

(58) Field of Classification Search
  CPC ............ G06F 17/50; G06F 15/76; G06F 9/30
  USPC ....................................................... 716/121
  See application file for complete search history.

(56) References Cited

U.S. PATENT DOCUMENTS

| | | | |
|---|---|---|---|
| 5,870,588 A | 2/1999 | Rompaey et al. | 395/500 |
| 6,014,038 A | 1/2000 | How et al. | 326/46 |
| 6,178,541 B1* | 1/2001 | Joly et al. | 326/38 |
| 6,331,790 B1 | 12/2001 | Or-Bach et al. | 326/41 |
| 6,477,683 B1* | 11/2002 | Killian et al. | 716/106 |
| 6,580,289 B2 | 6/2003 | Cox | 326/40 |
| 6,690,194 B1* | 2/2004 | How et al. | 326/39 |
| 6,701,515 B1 | 3/2004 | Wilson et al. | 717/117 |
| 6,760,888 B2* | 7/2004 | Killian et al. | 716/102 |
| 6,873,185 B2 | 3/2005 | Cox | 326/47 |
| 6,941,548 B2 | 9/2005 | Goodwin et al. | 717/151 |
| 6,943,415 B2 | 9/2005 | Corrigan | 257/390 |
| 6,954,917 B2* | 10/2005 | How et al. | 716/114 |
| 6,988,154 B2 | 1/2006 | Latta | 710/240 |

(Continued)

OTHER PUBLICATIONS

Cali et al., "Platform IC with embedded via programmable logic for fast customization", IEEE, 2004, pp. 419-422.

(Continued)

*Primary Examiner* — A. M. Thompson
(74) *Attorney, Agent, or Firm* — Allen, Dyer, Doppelt, Milbrath & Gilchrist, P.A.

(57) ABSTRACT

A method is for designing an accelerator for digital signal processing including defining a software programmable fully pre-laid out macro by pre-laying out with a fixed topology a control logic of the DSP accelerator to obtain a fully pre-laid out control logic. The method further includes defining a hardware programmable partially pre-laid out macro by customizing a configurable layout area, thereby mapping a computational logic based on computation kernels related to an application of the DSP accelerator. A partially pre-laid out computational logic is therefore obtained.

23 Claims, 3 Drawing Sheets

(56) References Cited

U.S. PATENT DOCUMENTS

| | | | |
|---|---|---|---|
| 7,003,758 B2 * | 2/2006 | Ye et al. | 716/52 |
| 7,010,558 B2 | 3/2006 | Morris | 708/409 |
| 7,030,646 B1 | 4/2006 | Tyson | 326/38 |
| 7,064,580 B2 | 6/2006 | Lawson et al. | 326/41 |
| 7,124,376 B2 * | 10/2006 | Zaidi et al. | 716/102 |
| 7,200,735 B2 | 4/2007 | Wang et al. | 712/33 |
| 7,243,315 B2 | 7/2007 | Tan et al. | 716/2 |
| 7,248,071 B2 | 7/2007 | Cox | 326/39 |
| 8,117,424 B2 * | 2/2012 | Boggs et al. | 712/41 |
| 8,738,349 B2 * | 5/2014 | Bertacco et al. | 703/15 |
| 2003/0041235 A1 | 2/2003 | Meyer | 713/1 |

OTHER PUBLICATIONS

Campi et al., "Sustainable (Re-) configurable solutions for the high volume SoC market", IEEE, 2008, pp. 1-8.

Chattopadhyay et al., "Design space exploration of partially re-configurable embedded processors", EDAA, 2007, pp. 319-324.

Dally et al., Structured application-specific integrated circuit (ASIC) study, USAF, 2008, pp. 1-41.

Pileggi et al., "Exploring regular fabrics to optimize the performance-cost trade-off", IEEE, 2003, pp. 782-787.

Wu et al., "Structured ASIC, evolution or revolution?", Faraday Technology Corporation, 2004, pp. 103-106.

Zahiri, "Structured ASICs" opportunities and challenges IEEE, 2003, pp. 1-6.

\* cited by examiner

METHOD OF DESIGNING A HIGH PERFORMANCE APPLICATION SPECIFIC INTEGRATED CIRCUIT ACCELERATOR

FIELD OF THE INVENTION

The present invention relates to a method for designing a high performance ASIC (Application-Specific Integrated Circuit) configurable accelerator, in particular, for System-on-Chip applications. More specifically, the invention relates to a method for designing a configurable accelerator for digital signal processing or a DSP accelerator, and to the related accelerator. In addition, the invention particularly, but not exclusively, relates to a designing method to be used in connection with an Ultra Deep Submicron (UDSM) technology, and the following description is made with reference to this field of application for convenience of explanation only.

BACKGROUND OF THE INVENTION

With the advent of the so-called Ultra Deep Submicron (UDSM) technologies, lithography scaling has created feasibility issues with respect to the currently used design flows and tools. These issues, depending on the perspective of the analysis, have been labelled Productivity Gap, Predictability Gap, or EDA (Electronic Design Automation) Gap.

Essentially, there appears to be an increasing difference between what it is possible to design in a given technology generation, and what is reasonably affordable to design. In particular, these problems are addressed in the article to L. Pileggi, H. Schmit et al. entitled: "Exploring Regular Fabrics to Optimize the Performance-Cost Tradeoff", DAC 2003.

For instance, as CMOS technology scales to finer feature sizes, it can be verified that complexity of integration grows exponentially. A dramatic increase in the number of physical parameters to be controlled leads to higher cost and lower accuracy of the design models and tools on which designers base their assumptions when designing new products.

In particular, UDSM technology appears to be more problematically affected than earlier ones to factors such as process variations, wire coupling, thermal variability, static and dynamic power integrity, electro-magnetic interference and others. Those factors impact timing analysis, making the modeling of the timing behavior of a circuit realized according to the UDSM technology, and thus the timing closure of the corresponding designs, more and more unreliable.

In addition to this, new challenges are imposed by layout printability: faithful reproduction of the layout shapes on silicon is more complex and unreliable at every scaling of the prior technology, and thus it becomes extremely critical for the new UDSM technology. Optical Proximity Correction (OPC) techniques are usually applied in order to address this issue, but they are only effective to a given extent.

In particular, printability variations impose parametric failures, resulting in variation of gate strengths and clock skews, thus leading to timing errors not detectable by the standard design and verification flows, since these flows usually analyze a planned layout, but not its deviations, during the manufacturing process.

Still worse, most of the faults induced by the above indicated factors are not detected by traditional fault models which are commonly used by automated test pattern generations (ATPG). All the above has a dramatic impact on yields and EDA tools designed to increase them, and thus, ultimately, on integration costs of a circuit realized according to the more recent technologies, in particular to the UDSM technology.

Yield problems, printability rules and the need for timing predictability impose to layout designers the introduction of restrictive rules when designing a circuit, the so called Design for Manufacturing (DFM) rules. Design regularity has often been suggested as the most suitable approach to challenge manufacturability issues.

Regular, repetitive design approaches, such as the approaches that fall under the broad label of Structured ASICs (S-ASIC), show inherent advantages over standard-cell based design flows, as described for instance in the articles to B. Zahiri entitled: "Structured ASICs: Opportunities and Challenges", ICCD 2003, and to Kun-Cheng Wu, Yu-Wen Tsai entitled: "Structured ASIC: Evolution or Revolution?" ISPD 2004. The underlying concept behind such Structured ASICs is as follows: although there is a variety of alternative architectures, these architectures are based on a fundamental element called "tile" or "module". The tile contains a small amount of generic logic implemented either as gates and/or multiplexers and/or a lookup table. Depending on the particular architecture, the tile may contain hardwired sequential elements (i.e. flip-flops, small SRAMs).

An array of tiles is then prefabricated across the face, or in a specific region of the chip. As a consequence, the majority of the layout mask layers are also prefabricated. This means that transistors forming the core logical functions of each tile (gates, multiplexers, etc) are already available and wired together. Also, the large part of the local and global interconnections has been implemented too.

As a consequence, the customization of the above described logical functions towards a final product for a given application is achieved appropriately designing a reduced set of metallization layers and via connections. In particular, only few remaining via/metallization layers are to be specified in the manufacturing flow when using a S-ASIC in order to customize the desired functionality of a final product to be obtained.

Structured ASIC solutions, especially at the full-chip scale, are widely used. For instance, in its Hardcopy program, Altera offers the possibility to convert a design mapped on its FPGA families to a metal and via-programmable support, thus ensuring smooth transition between flexible prototyping platforms to high performance hardwired solution. This approach is described for instance in U.S. Pat. Nos. 7,030, 646, 7,243,315 and 7,064,580.

LSI Logic has taken a similar path, as described for instance in U.S. Pat. Nos. 6,954,917 and 6,690,194, by providing a mask-programmed Structured ASIC approach defined RapidChip, based on a logic gate array fabric. Complementing the Altera approach, LSI provides a smooth transition flow between RapidChip designs and their standard-cell based solutions. Other semiconductor manufacturers have also formalized their Structured ASIC product portfolio. It is very common to complement Structured ASIC manufacturing products with embedded hardwires units such as Memories, specific DSP acceleration units or Microprocessors (Platform ASIC).

The relevant advantage of a Structured ASIC based design is that this approach allows to significantly reduce Non-Recurring Engineering (NRE) costs (i.e. the one-time cost of researching, designing, and testing a new product) and implementation issues, as described by F. Campi et al. in the article entitled: "Sustainable (re-)configurable solutions for the high-volume SoC market", IPDPS 2008. In particular, using Structured ASICs, implementation costs are significantly lowered since the number of masks to be redesigned per each product is reduced by roughly two-thirds, and design costs are also reduced because many critical design issues, such as clock distribution or scan-chain insertion, are often already handled on the prefabricated logic.

Even more significant implications apply to manufacturability issues: while a standard cell library may include a few hundred of different cells, whose position and connection in a given silicon region vary completely in different design implementations, Structured ASIC design can focus over small and localized regions that are regularly repeated. On those regions, investment can be concentrated, from the manpower and tools points of view, in order to maximize performance while retaining manufacturability.

Moreover, differently from standard cell design, the placing of Structured ASIC cells is known in advance and completed by distributed buffering, thus providing a regular pattern that greatly eases timing characterization of the final design. On the other hand, Structured ASIC-based design induces overheads that may not be acceptable for all segments of the semiconductors market. In fact, depending on the chosen technology orientation, Structured ASIC approaches may impose a 1.3× to 2× multiplicative factor in area occupation and a 1.5× to 3× dividing factor in performance. For computational intensive applications this may not be applicable, severely limiting overall system performance or overriding the maximum area specifications.

In summary, while a full-scale Structured ASIC approach is very appealing for low to medium volume market segments, it is clearly not acceptable for other segments, for example high-end signal processing Systems-on-Chip (SoCs). In particular, in this market segment, hybrid chips have been used, wherein the standard cell-based design is enhanced with one (or more) mask-programmable regions, as described in the article to L. Cali' et al. entitled: "Platform IC with Embedded Via Programmable Logic for Fast Customization", CICC04, wherein a Structured ASIC to be embedded in a SoC architecture to provide an application specific customisation is described.

Also known are approaches using Structured ASICs to be embedded in hybrid Systems-on-Chip, as described for instance in U.S. Pat. Nos. 6,331,790, 6,580,289, 6,873,185, 7,248,071, 6,014,038, 6,943,415 and 6,690,194. In particular, U.S. Pat. No. 6,331,790 describes a design method for a Structured ASIC using SRAMs and thus of a configuration bitstream. In this case, the need to store and handle a configuration bitstream imposes an overhead in area and control issues that could not match the requirements of different semiconductor product market sectors.

Of course, the two options (Structured ASIC and hybrid approaches) can be merged or complemented in many ways. In particular, the designers determine a cost function based on three independent parameters:

1. what parts of the design are timing critical (so they may be designed with a costly standard optimized full-mask layout approach to meet specifications);

2. what parts of the design can be considered fixed over a large spectrum of customizations (so they can be designed with a costly standard optimized full-mask approach as the cost can be amortized over large volumes); and 3. how much area overhead can be afforded in the design (so that significant portions of the design, not falling in the two above categories, can be designed with lower optimization effort and/or exploiting mask-programmable technologies).

The aspects to be optimized are namely linked to mask costs, NRE costs, TTM (Time to Market) requirements, and manufacturability. More precisely, since the above factors are strictly correlated, the aim is to determine a best ratio induced by the obtained manufacturability margin versus the corresponding NRE cost.

A significant added value of the mask programmable hardware, in particular in the high volume domain, is the opportunity to alter the above ratio in the direction of a higher manufacturability per cost unit. In particular, the design complexity of high volume Systems-on-Chip is such that this result could be obtained at negligible or very low performance/area overhead by carefully managing the parameters outlined above.

In the field of Systems-on-Chip design, various different design methodologies are used in order to minimize design costs and shortening time to market in the deployment of a given DSP accelerator. On the one hand, carefully tuned and specifically verified pre-laid out macros for IP (Intellectual Property) reuse are commonly used. In particular, reusable IP macros for System-on-Chip design can be fully hardwired logic blocks which may be either analog or digital (i.e. SRAMs, PLLs, I/O controllers, Arithmetic Units). In other cases, some design customization is allowed by the user and it is deployed at software level (Microcontrollers, Digital Signal Processors), or exploiting run-time reconfigurable hardware units (Field Programmable Gate Arrays or FPGAs, Coarse Grained Reconfigurable Architectures).

On the other hand, Design-time reconfiguration is largely exploited at the Register Transfer Language (RTL) design level, in particular via Hardware description language (HDL) constructs, such as constants and generics, or via EDA tools, such as Synopsys' CoreTools. Also known are the application specific or configurable processors, i.e. processor architectures that can be customized to a given application domain by "instruction set metamorphosis", adapting their pipelining and adding function units configured to accelerate the specific functionalities required by the application. These known processor architectures are described for instance in U.S. Pat. Nos. 5,870,588, 6,988,154, 7,010,558, 6,701,515, 6,988,154, 6,760,888, 6,477,683, 6,941,548 and in U.S. patent application Ser. No. 10/196,423. In these documents, different methodologies are described for defining the RTL architecture of a processor, their effectiveness being put at stake by the manufacturability and timing analysis issues as described above.

Finally, U.S. Pat. No. 7,200,735 describes a hybrid processor, in which the base processor includes a custom logic circuit and the configurable logic circuit includes standard cell or gate-array logic circuits, the hardwired control section being described at RTL level, relying on traditional design flows for physical implementation.

It is however remarked that, if deployed on aggressive technology nodes, this known approach may lead to physical issues, encountering pitfalls and uncertainties that affect, for instance, design flows for Ultra Deep Submicron technologies. Moreover, designers exploiting such an approach may be forced to entirely restart an implementation flow for each utilization of the same RTL, with the related TTM issues, and design and verification costs.

SUMMARY OF THE INVENTION

A method is for designing an accelerator for digital signal processing (DSP) which defines at least a portion of the control logic of such an accelerator to be software programmable, and defines at least a portion of the computational logic of this accelerator to be hardware customizable. The DSP accelerator is thus realizable according to a recent silicon technology, in particular the UDSM (Ultra-Deep Sub-Micron) silicon technology.

Advantageously, the control logic portion is fully pre-laid out with a fixed topology using standard design flows, such as RTL-to-ASIC standard-cell based design flow or custom layout design flow. Moreover, the computational logic portion is partially pre-laid out and customized on the basis of a specific application by appropriately configuring a restricted set of lithography mask layers.

In particular, in the following description, the definition fully pre-laid out or fully laid out will be used to indicate a reusable design flow, which in particular may relate to the software programmable portion.

On the contrary, partially laid out may be used to indicate a zone wherein base structures, which correspond to a subset of diffusion masks, as will be clarified hereinafter, are realized during the accelerator design, while the other structures of the zone are differently realized, in a specific way which corresponds to the accelerator application field, in a customization step.

It may be important to note that the computational logic may be customized upon specific requests. In this context the definition of a partially pre-laid out computational logic should be regarded as a definition of generic structures which may be reused in different contexts, the pre-laid out generic structure making a subsequent customization step of the DSP accelerator easier and cheaper.

Moreover, it is clarified that a further step of software programming of the fully laid out portion is also provided, while the initial partitioning in the accelerator layout between a fully pre-laid out control logic and a subsequent customization step as advantageously proposed is actually responsible for the NRE and TTM costs reduction.

On the basis of the foregoing, a method for designing an accelerator for digital signal processing or DSP accelerator comprises at least:
  defining a software programmable fully pre-laid out macro by pre-laying out, with a fixed topology, a control logic of the DSP accelerator to thus obtain a fully pre-laid out control logic; and
  defining a hardware programmable partially pre-laid out macro, by customizing a configurable layout area and mapping a computational logic based on computation kernels pertinent to an application of the DSP accelerator to thus obtain a partially pre-laid out computational logic.

Advantageously, the step of defining a software programmable fully pre-laid out macro comprises a step of pre-laying out with a fixed topology, of the synchronization, control, and data routing logic of the DSP accelerator.

Moreover, the pre-laying out step may be realized by using an RTL-to-ASIC standard-cell based design flow. The method may further comprise a step of verification and characterization of the design behavior and timing of the fully pre-laid out control logic.

In particular, the step of defining a hardware programmable partially pre-laid out macro may comprise a step of mapping generic layout structures on a spatial region specifically reserved for this purpose. The method may further comprise a step of customizing the partially pre-laid out computational logic by configuring a restricted set of lithography mask layers, and a step of defining fixed area and fixed connections of the partially-laid out computational logic to the fully-laid out control logic.

The step of defining a software programmable fully pre-laid out macro corresponding to the fully pre-laid out control logic may be realized by defining a programmable FSM (Finite State Machine) engine or a micro-processor architecture.

Moreover, the step of defining a software programmable, fully pre-laid out macro corresponding to the fully pre-laid out control logic may comprise one of the following alternative steps of defining:
  a set of single port or dual port memory buffers included in the fully pre-laid out control logic to act as a temporary results repository; and
  a data route from an external world into the DSP accelerator.

In particular, the step of defining a data route may be performed by using one of the following alternatives:
  (i) a standard system bus with the DSP accelerator acting as master or slave,
  (ii) a network on chip with the DSP accelerator acting as target or initiator,
  (iii) a stream-oriented communication structure via FIFO (First-In First-Out) memories, or
  (iv) a custom communication protocol.

In particular, the step of defining a software programmable fully pre-laid out macro corresponding to the fully pre-laid out control logic may be performed by using one of the following alternatives:
  (i) a standard processor/coprocessor approach where explicit MOVE instructions load data into the partially pre-layouted computational logic,
  (ii) an additional function unit of a processor fed from a processor register file, or directly accessing a processor data memory,
  (iii) automated address generators on local memory buffers,
  (iv) an embedded DMA (Direct Memory Access) engine accessing either an external bus system or internal buffers,
  (v) a stream-oriented approach with FIFO memories, and
  (vi) a pipelined approach controlled by a hardwired sequencer.

The step of defining a software programmable fully pre-laid out macro corresponding to the fully pre-laid out control logic may define a clock distribution according to one of the following alternatives:
  (i) a same clock domain between the fully pre-laid out control logic and the partially pre-laid out computational logic, and
  (ii) independent clock domains with appropriate clock domain crossing circuitry shared between the fully pre-laid out control logic and the partially pre-laid out computational logic.

Moreover, the step of defining a hardware accelerator comprising a hardware programmable fully pre-laid out control logic and a partially pre-laid out computational logic may also define a partitioning in several clock domains. Further, the step of defining a software programmable fully pre-laid out macro corresponding to the fully pre-laid out control logic may also comprise the steps of appropriately loading, reordering and routing data to the partially pre-laid out computational logic.

Moreover, the step of defining a hardware programmable partially pre-laid out macro corresponding to the partially pre-laid out computational logic may be realized by defining one of the following alternatives:
  (i) a full mask design constrained by area, pin and timing specifications,
  (ii) a coarse grained structured ASIC approach based on modules built of a subset of a given standard cell library,
  (iii) a coarse grain structured ASIC approach based on logic computation elements such as Arithmetical and Logical units, Lookup-tables (LUTs), other computational elements or a mixture of the above, (iv) a fine grained structured ASIC approach based on a repetition of elementary gates complemented by an embedded sequential logic, and (v) a fine grained approach where sequential logic for pipelining is mapped over elementary gates.

Furthermore, the step of defining the hardware programmable partially pre-laid out macro, corresponding to the partially pre-laid out computational logic, may further comprise a step of defining an interconnect, according to one of the following alternatives, that is:

(i) defined by a user customization step, or (ii) based on pre-defined routing patterns customized by appropriate via or metallization instances.

The method may further comprise a step of defining the accelerator in terms of a programmable ASIC accelerator, a programmable data-path, a digital signal processor (DSP), an Application Specific Instruction Set Processor (ASIP), or a configurable processor. Finally, the method may be included in a standard SoC design flow.

Another approach is directed to an accelerator for digital signal processing or DSP accelerator comprising at least:

a software programmable fully pre-laid out control logic, and a hardware programmable partially pre-laid out computational logic based on computation kernels pertinent to an application of the DSP accelerator.

Advantageously, the fully pre-laid out control logic may comprise a synchronization, control, and data routing logic, that are a general purpose portion of the fully pre-laid out control logic. Moreover, the fully pre-laid out control logic may further comprise a programmable FSM (Finite State Machine) engine or a micro-processor architecture.

Advantageously, the fully pre-laid out control logic may further comprise one of the following alternatives:

a set of single port or dual port memory buffers included into the fully pre-layouted control logic to act as temporary results repository, and a data route from an external world into the DSP accelerator.

In particular, the data routing may comprise one of the following alternatives:

(i) a standard system bus with the DSP accelerator acting as master or slave, (ii) a network on chip with the DSP accelerator acting as target or initiator, (iii) a stream-oriented communication structure via FIFO (First-In First-Out) memories, or (iv) a custom communication protocol-based structure.

Also, the fully pre-laid out control logic may further comprise one of the following alternatives:

(i) a standard processor/coprocessor system wherein explicit MOVE instructions load data into the partially pre-laid out computational logic, (ii) an additional function unit of a processor fed from a processor register file or directly accessing a processor data memory, (iii) automated address generators on local memory buffers, (iv) an embedded DMA (Direct Memory Access) engine accessing either an external bus system or internal buffers, (v) FIFO memories, in order to exploit a stream-oriented approach, or (vi) a hardwired sequencer controlling a pipelined system.

Further, the fully pre-laid out control logic may further comprise a controlling FSM/processor which does not load input data internally before feeding the DSP accelerator.

Moreover, the partially pre-laid out computational logic may comprise a fixed area and fixed connections to the fully pre-laid out control logic.

The partially pre-laid out computational logic may comprise generic layout structures on a spatial region specifically reserved for this purpose. In particular, the partially pre-laid out computational logic may further comprise, as generic layout structures, one of the following alternatives:

(i) a full mask design structure constrained by area, pin and timing specifications, (ii) a coarse grained structured ASIC based on modules built of a subset of a given standard cell library, (iii) a coarse grain structured ASIC based on logic computation elements such as Arithmetical and Logical units, Lookup-tables (LUTs), other computational elements, or a mixture of the above, (iv) a fine grained structured ASIC based on a repetition of elementary gates complemented by an embedded sequential logic, or (v) a fine grained structure where sequential logic for pipelining is mapped over elementary gates.

Also, the partially pre-laid out computational logic may further comprise an interconnection system, which can be:

(i) entirely defined by a user customization, or (ii) based on pre-defined routing patterns customized by appropriate via or metallization instances.

Finally, the DSP accelerator may further comprise a common clock signal shared by the fully pre-laid out control logic and the partially pre-laid out computational logic, or two independent clock domains with appropriate clock domain crossing circuitry shared between the fully pre-laid out control logic and the partially pre-laid out computational logic.

The characteristics and advantages of the designing method and of the DSP accelerator, according to the invention, will be apparent from the following description of an embodiment thereof given by way of indicative and non limiting example with reference to the annexed drawings.

DETAILED DESCRIPTION OF THE PREFERRED EMBODIMENTS

Figure 1:
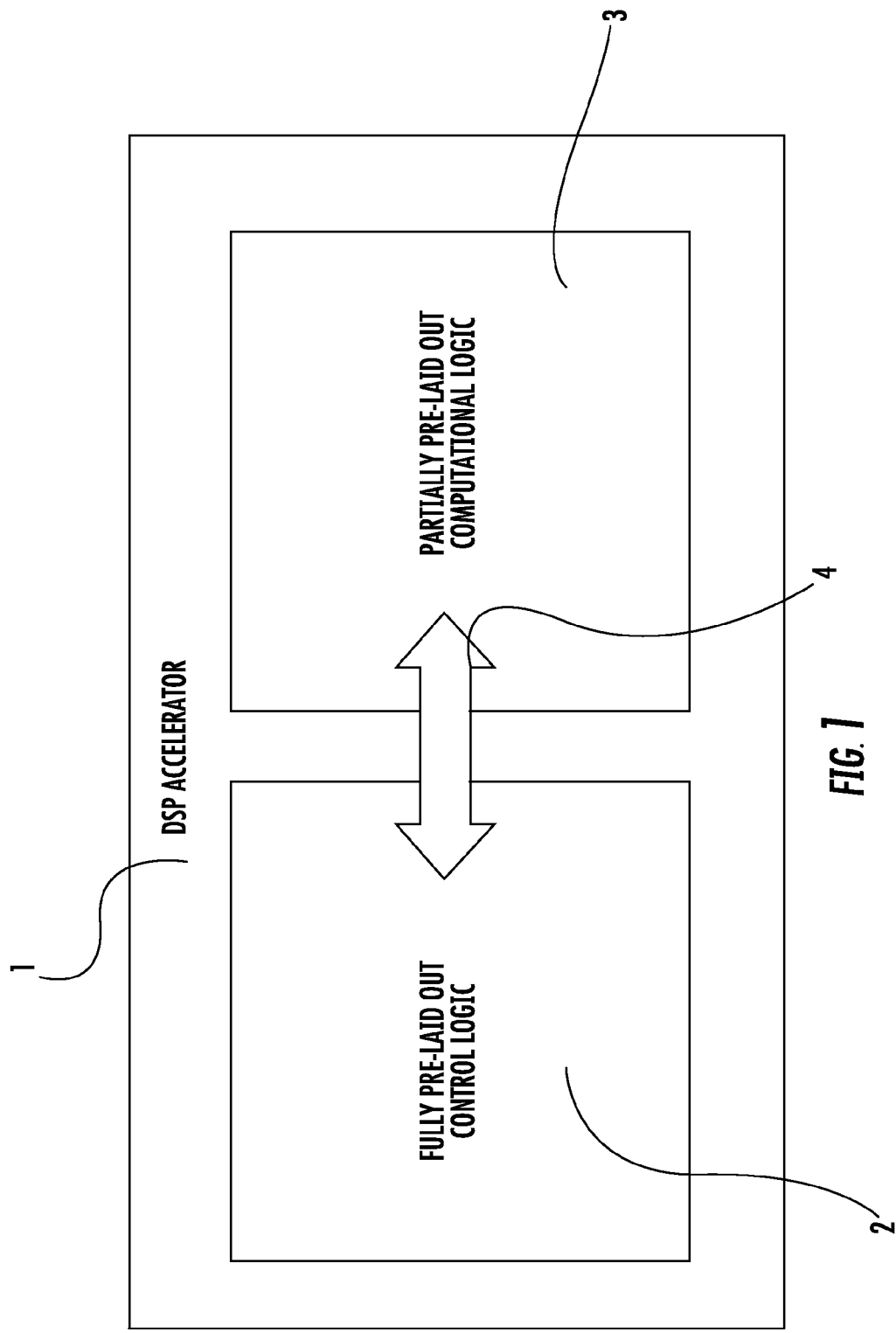
FIG. 1 schematically shows a DSP accelerator realized using the designing method of the present invention.

The present invention relates to method for designing an accelerator for digital signal processing or DSP accelerator. In particular, the method is based on a functional partition of the DSP accelerator into:

(a) a control logic, which handles synchronization of the computation, data routing, and consistency of data dependencies, and (b) a computational logic, with a set of specific arithmetical/logical operators, whose nature and interconnection will provide a desired functionality to the accelerator itself.

It is remarked that the control logic tends to be smaller in size but more critical from the performance point of view. On the contrary, the computational logic can be very large in size, although it usually comprises a repetition of similar arithmetical structures.

Moreover, it should be kept in mind that, accepting a small overhead, the control logic can be defined in order to be quite general, and reusable across a very broad range of signal processing applications, while the design and interconnection of the computational logic strongly depend on the desired functionality, and thus to a target application for the DSP accelerator and its deployment.

Advantageously, the method for designing an accelerator for digital signal processing or DSP accelerator comprises at least the steps of:
  defining a software programmable fully pre-laid out macro by pre-laying out with a fixed topology, a control logic of the DSP accelerator thus obtaining a fully pre-laid out control logic; and
  defining a hardware programmable partially pre-laid out macro by customizing a configurable layout area mapping a computational logic based on computational kernels pertinent to an application of the DSP accelerator, to thus obtain a partially pre-laid out computational logic.

In this way, as will be described in more detail in the following description with reference to FIG. 1, the DSP accelerator 1 comprises a fully pre-laid out control logic 2 and a partially pre-laid out computational logic 3.

In particular, the step of defining a software programmable fully pre-laid out macro comprises pre-laying out with a fixed topology of the synchronization, control and data routing logic of the DSP accelerator 1, which is substantially the general purpose portion of the control logic 2.

This pre-laying out step is preferably realized by using an RTL-to-ASIC standard-cell based design flow. Other design flows such as custom or semi-custom layout design flows can be also used. It is remarked that the fully pre-laid out control logic 2 can be maintained identical across a very broad range of target applications and is expected to be small with respect to the size of the overall computational and control logic (in the range of 50 to 200 Kgates).

For this reason, design efforts and related NRE costs for the fully pre-laying out of such control logic 2 can be high, as they are concentrated on a small design area and are safely amortized on a high range of design projects. The method further comprises a step of verification and characterization of the design behavior and timing of the fully pre-laid out control logic 2. In this way, several prototypes can be delivered in order to ensure satisfactory yield and predictable timing analysis.

Moreover, the step of defining a hardware programmable partially pre-laid out macro comprises a step of mapping of generic layout structures on a spatial region specifically reserved for this purpose, which obtains the partially pre-laid out computational logic 3. In particular, this mapping provides a layout which is pre-designed and advantageously distributed prior to a final customization step of the spatial region of such partially pre-laid out computational logic 3 for a large range of different design projects in order to amortize design costs and a part of the mask costs.

The method then advantageously comprises a step of customizing the partially pre-laid out computational logic 3 by appropriately configuring a restricted set of lithography mask layers. In this way, a developer will simply provide to the customer the design tools for performing the final customizing step. Advantageously, the method also comprises a step of defining fixed area and fixed connections (i.e., layout pins) of the partially laid out computational logic 3 to the fully laid out control logic 2. Moreover, a set of timing specifications for each pin is pre-defined to ensure that the final customized design of the DSP accelerator 1 does not affect the critical path of the system as a whole.

In essence, the method advantageously divides the design of the DSP accelerator into two portions, namely aimed to define software and hardware programmable pre-laid out macros corresponding to the control and to the computational logics that are mapped on different technology supports.

More particularly, the step of defining the software programmable fully pre-laid out macro corresponding to the fully pre-laid out control logic, and namely to the general purpose data-path synchronization and control, and to the data routing, is realized by defining a programmable FSM (Finite State Machine) engine.

As an alternative, a micro-processor architecture can be also used to perform such a step of defining the software programmable fully pre-laid out macro corresponding to the fully pre-laid out control logic.

Moreover, alternative embodiments of the DSP accelerator can be obtained by combining alternative choices for its internal elements. In particular, the step of defining the software programmable fully pre-laid out macro corresponding to the fully pre-laid out control logic can define:
  a set of single port or dual port memory buffers included into the fully pre-laid out control logic to act as a temporary results repository; and
  a data route from an external world into the DSP accelerator.

In particular, such a data route can be based on the following systems:
  (i) a standard system bus with the DSP accelerator acting as master or slave,
  (ii) a network on chip with the DSP accelerator acting as target or initiator,
  (iii) a stream-oriented communication structure via FIFO (First-In First-Out) memories, or
  (iv) a custom communication protocol.

Moreover, the step of defining the software programmable fully pre-laid out macro corresponding to the fully pre-laid out control logic can be based on:
  (i) a standard processor/coprocessor approach where explicit MOVE instructions load data into the partially pre-laid out or customizable computational logic,
  (ii) an additional function unit of a processor fed from the processor register file or directly accessing the processor data memory,
  (iii) exploiting automated address generators on local memory buffers,
  (iv) exploiting an embedded DMA (Direct Memory Access) engine accessing either the external bus system or internal buffers,
  (v) utilizing stream-oriented approach with FIFO memories, or
  (vi) utilizing a pipelined approach controlled by a hard-wired sequencer.

Also, the step of defining the software programmable fully pre-laid out macro corresponding to the fully pre-laid out control logic can define a clock distribution which can be:
  (i) a same between the fully pre-laid out control logic and the partially pre-laid out computational logic, or
  (ii) the two logics may feature independent clock domains with appropriate clock domain crossing circuitry shared between them.

As an alternative, the step of defining the hardware accelerator comprising a hardware programmable fully pre-laid out control logic and a partially pre-laid out computational logic can further comprise a partitioning in several clock domains.

A particularly advantageous feature of the DSP accelerator that helps to increase throughput comprises a controlling FSM/processor which does not load input data internally before feeding the data-path.

Moreover, the step of defining the software programmable fully pre-laid out macro corresponding to the fully pre-laid out control logic is used to appropriately load, reorder, and route data to the partially pre-laid out computational logic.

Also, the step of defining the hardware programmable partially pre-laid out macro, corresponding to the partially pre-laid out computational logic, is realized by defining one of the following alternatives:

(i) a full mask design constrained by area, pin, and timing specifications, (ii) a coarse grained structured ASIC approach based on modules built of a subset of a given standard cell library, (iii) a coarse grain structured ASIC approach based on logic computation elements such as Arithmetical and Logical units, Lookup-tables (LUTs), other computational elements, or a mixture of the above, (iv) a fine grained structured ASIC approach based on a repetition of elementary gates complemented by an embedded sequential logic, or (v) a fine grained approach where sequential logic for pipelining is mapped over elementary gates.

The above alternative approaches provide generic layout structures on a spatial region specifically reserved for this purpose, as defined in the step of defining a hardware programmable partially pre-laid out macro.

Moreover, alternative embodiments of the DSP accelerator can be obtained by defining the interconnect in the step of defining the hardware programmable partially pre-laid out macro, corresponding to the partially pre-laid out computational logic, according to one the following alternatives:

(i) the interconnect being entirely defined by the user customization step, or (ii) the interconnect being based on pre-defined routing patterns customized by appropriate via or metallization instances.

According to an alternative embodiment, the method further comprises a step of defining the accelerator in terms of a programmable ASIC accelerator, a programmable data-path, a digital signal processor (DSP), an Application Specific Instruction Set Processor (ASIP), or a configurable processor.

The present disclosure further relates to an accelerator for digital signal processing or DSP accelerator, schematically shown in FIG. 1, globally indicated at 1. The DSP accelerator 1 comprises at least:

a software programmable fully pre-laid out control logic 2; and a hardware programmable partially pre-laid out computational logic 3 based on computation kernels pertinent to an application of the DSP accelerator.

In particular, the fully pre-laid out control logic 2 comprises synchronization, control, and data routing logic 5, which is substantially the general purpose portion of the control logic. As already remarked, in this way, the fully pre-laid out control logic 2 can be maintained across a very broad range of target applications and design efforts, and related NRE costs for this fully pre-laid out control logic 2 can be high, as they are concentrated on a small design area and are safely amortized on a high range of design projects.

Moreover, the partially pre-laid out computational logic 3 comprises a fixed area and fixed connections 4 to the fully pre-laid out control logic 2. Furthermore, the fully pre-laid out control logic 2 comprises a programmable FSM (Finite State Machine) engine 6.

As an alternative, the fully pre-laid out control logic 2 can comprise a micro-processor architecture, not shown in the figures.

Figure 2:
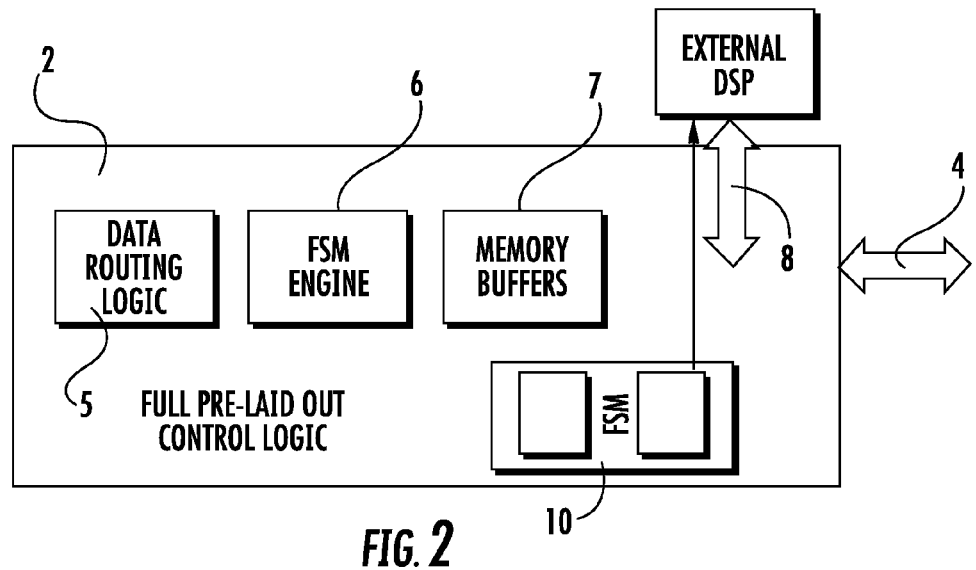
FIG. 2 schematically shows further details of the DSP accelerator of FIG. 1.

Moreover, alternative embodiments of the fully pre-laid out control logic 2 of the DSP accelerator 1, as shown in FIG. 2, can comprise:

a set of single port or dual port memory buffers 7 included into the fully pre-laid out control logic 2 to act as a temporary results repository; and a data route 8 from an external world into the DSP accelerator 1.

In particular, such a data route 8 can comprise:

(i) a standard system bus with the DSP accelerator 1 acting as master or slave, (ii) a network on chip with the DSP accelerator 1 acting as target or initiator, (iii) a stream-oriented communication structure via FIFO (First-In First-Out) memories, or (iv) a custom communication protocol-based structure.

Moreover, the fully pre-laid out control logic 2 can comprise:

(i) a processor/coprocessor system wherein explicit MOVE instructions load data into the partially pre-laid out or customizable computational logic 3, (ii) an additional function unit of a processor fed from a processor register file or directly accessing a processor data memory, (iii) automated address generators on local memory buffers, (iv) an embedded DMA (Direct Memory Access) engine accessing either an external bus system or internal buffers, (v) FIFO memories, in order to exploit a stream-oriented approach, or (vi) a hardwired sequencer controlling a pipelined system.

Also, the DSP accelerator 1 can comprise a common clock signal shared by the fully pre-laid out control logic 2 and the partially pre-laid out computational logic 3, or two independent clock domains with appropriate clock domain crossing circuitry shared between them.

Advantageously, the fully pre-laid out control logic 2 of DSP accelerator 1 may comprise a controlling FSM/processor 10 which does not load input data internally before feeding the DSP accelerator 1, in order to increase throughput.

Also, the partially pre-laid out computational logic 3 comprises generic layout structures on a spatial region specifically reserved for this purpose.

Figure 3:
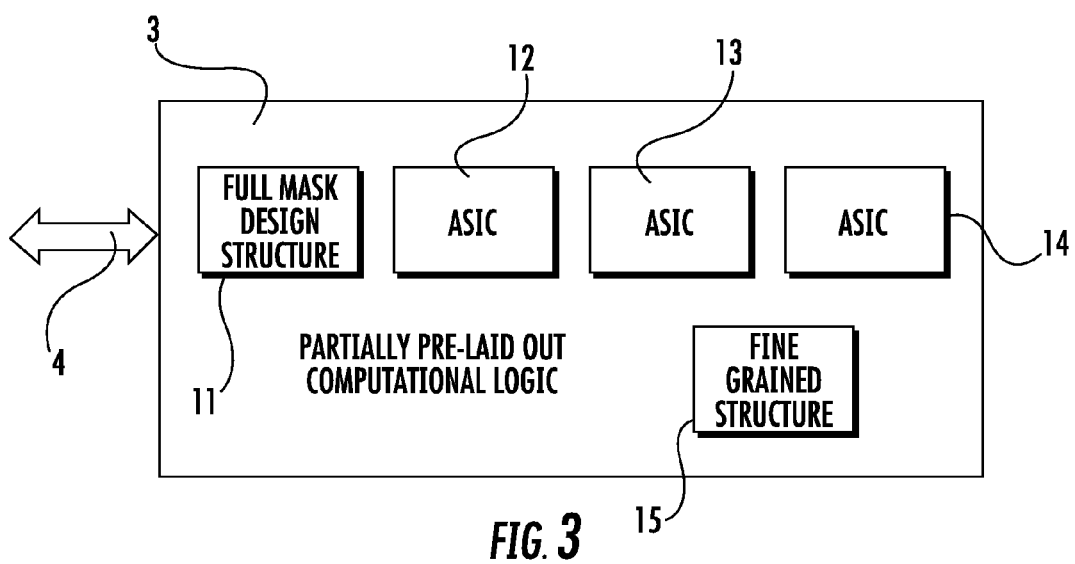
FIG. 3 schematically shows yet further details of the DSP accelerator of FIG. 1.

In particular, the partially pre-laid out computational logic 3 comprises as generic layout structures one of the following alternatives, all shown in FIG. 3 for sake of simplicity:

(i) a full mask design structure 11 constrained by area, pin, and timing specifications, (ii) a coarse grained structured ASIC 12 based on modules built of a subset of a given standard cell library, (iii) a coarse grain structured ASIC 13 based on logic computation elements such as Arithmetical and Logical units, Lookup-tables (LUTs), other computational elements, or a mixture of the above, (iv) a fine grained structured ASIC 14 based on a repetition of elementary gates complemented by an embedded sequential logic, or (v) a fine grained structure 15 where sequential logic for pipelining is mapped over elementary gates.

Moreover, according to alternative embodiments of the DSP accelerator 1, the partially pre-laid out computational logic 3 comprises an interconnection system, which can be:
(i) defined by user customization, or
(ii) based on pre-defined routing patterns customized by appropriate via or metallization instances.

In summary, the designing method comprises an organization of the DSP processor logic as a hybrid data-path that is tailored to the desired application environment at two levels:
Software-oriented programming of the fully pre-laid out control logic; and
Hardware customization of the partially pre-laid out computational logic.

In this way, the method for designing an accelerator for digital signal processing and the corresponding DSP accelerator overcome the drawbacks still affecting the known methods and devices and also have the following advantages.

Thanks to the dual nature of the designing method, system-level design issues (data flow control, memory transfer consistency, overall synchronization) are resolved by the step of defining the software programmable fully pre-laid out macro corresponding to the fully pre-laid out control logic, while most circuit level and manufacturing issues are resolved on the step of defining the hardware programmable partially pre-laid out macro corresponding to the partially pre-laid out computational logic.

In particular, thanks to its density, the fully pre-laid out control logic of the DSP accelerator also limits considerably the area overhead imposed by the utilization of a structured ASIC fabric in the partially pre-laid out computational logic. Furthermore, a heavily pipelined organization of the computation on the partially pre-laid out computational logic strongly minimizes the timing overhead imposed by a programmable mask of the fully pre-laid out control logic. This pipelined pattern is greatly eased by the intrinsic physical regularity of partially pre-laid out computational logic, as well as by the embedded hardwired control provided by fully pre-laid out control logic.

In essence, the crucial added value provided by the designing method and by the DSP accelerator is that they enable the design of programmable accelerators exploiting the advantages offered by the structured ASIC approach (namely a lower NRE cost and a short TTM) while reducing its drawback, that is the gate density (and thus ultimately silicon area), the power consumption, and the computation time. It is further emphasised that, even if these aspects are not killing factors for most companies exploiting the Standard ASIC concept today, because such organizations mostly target low-volume and average complexity projects, the same factors become a high priority for providers of other new and growing market sectors, such as the high end SoC products targeting high volume markets.

With respect to the known methods for design of programmable accelerators, such as the ones already described in the prior art section, the designing method of the present disclosure offers the opportunity to extend the "design-time configurability" reuse concept to the physical design. In particular, the utilization of design-time configurable processors allows the utilization of pre-fabricated customizable macros in place of RTL items, with consequent significant decrease of costs and risks of failures associated to the design.

Moreover, contrary the known structured ASIC solutions described in relation to the prior art, which provide full-chip customizable approaches, it is remarked that the communication and synchronization between a customizable accelerator and a standard System-on-Chip, according to the present disclosure is simplified and made easier.

More specifically, in the case of platform ASIC, the structure of the system, data control, synchronization, relative glue logic are mapped on the customizable product, with a relevant consequent overhead in area, performance and power consumption.

Advantageously according to the present disclosure, these elements are either parts of the surrounding SoC or they are mapped on the general purpose, hardwired control logic.

Moreover, it is remarked that the embedded structured ASIC such as the one described in the article to L. Cali' et al. discussed in the prior art section, is not included in a reusable macro, as according to the present disclosure, while in the chip top level, thus limiting the generality of this known approach. Moreover, the described embedded structured ASIC is intended to map a full accelerator, thus including both control logic and computational unit. Thus, it does not enjoy the flexibility and density advantage of mapping control over a hardwired programmable unit, as does the present disclosure. This is also the case of other prior art approaches, like the ones described in U.S. Pat. Nos. 6,580,289, 6,873,185, 7,248,071, 6,014,038, 6,943,415 and 6,690,194.

It is also remarked that, advantageously according to the present disclosure, a consistent physical design methodology for the implementation of configurable processors is offered.

In summary, the designing method and the DSP accelerator of the present disclosure are aimed at minimizing design and implementation cost, and providing high throughput computation, thus challenging ultra-deep submicron (UDSM) design issues normally referred to as the "Predictability Gap". These advantages are obtained by building a pre-laid out hardware macro for inclusion in SoC design. In particular, the initial partitioning in the accelerator layout between a fully pre-laid out control logic and a subsequent customization step as advantageously proposed in the present disclosure is actually responsible for the NRE and TTM costs reduction.

The layout of the DSP accelerator is thus based on partitioning the accelerator into a general purpose control logic that is designed with a standard ASIC design flow in order to provide enhanced performance, and a computation acceleration region that is customized at the mask level.

More particularly, the control logic, when based on microprocessor or FSM, is a general purpose solution which amortizes the high design costs over a large class of projects. Moreover, specific computational resources for acceleration are mapped over the mask-programmable support, which allows minimization of NRE (Non-Recurring Engineering) costs and TTM (Time-To-Market) for the specific accelerator. Finally, acceleration kernels are mapped over the mask-programmable fabric according to a heavily pipelined pattern in order to minimize performance overheads.

Figure 4:
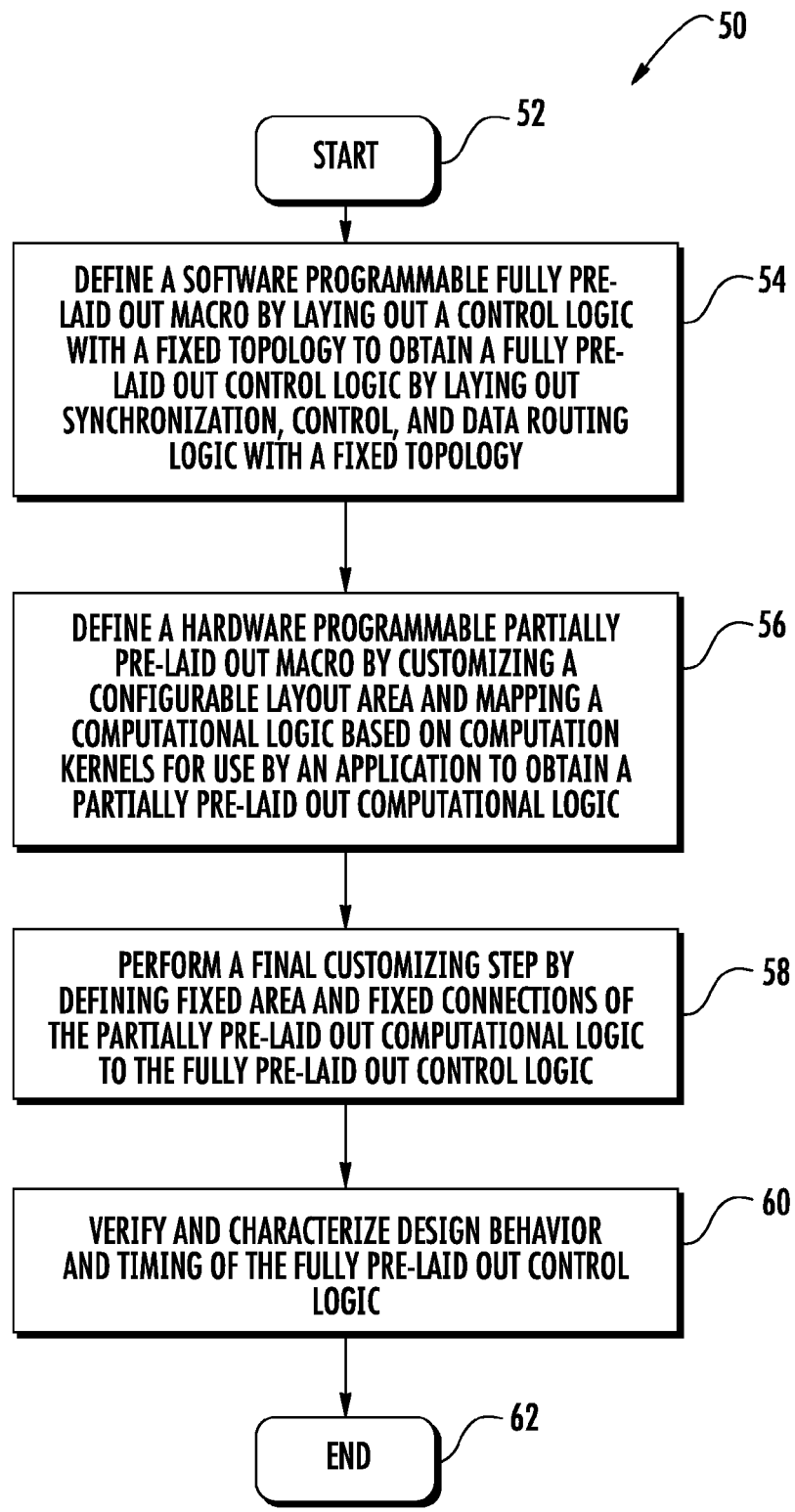
FIG. 4 is a flowchart illustrating a method of making a digital signal processing (DSP) accelerator in accordance with the present invention.

Referring now to the flowchart 50 illustrated in FIG. 4, from the start (Block 52), a method of making a digital signal .rocessing (DSP) accelerator com rises definin. at Block 54 software programmable fully pre-laid out macro by laying out a control logic with a fixed topology to obtain a fully pre laid-out control logic by laying out synchronization, control, and data routing logic with a fixed topology. A hardware programmable partially pre-laid out macro is defined at Block 56 by customizing a configurable layout area and mapping a computational logic based on computation kernels for use by an application to obtain a partially pre-laid out computational logic. A final customizing step is performed at Block 58 by defining fixed area and fixed connections of the partially pre-laid out computational logic to the fully pre-laid out control logic. The method further comprises verifying and characterizing desi n behavior and timing of the full relaid out control logic at Block 60. The method ends at Block 62.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A method of making a digital signal processing (DSP) accelerator comprising:
   operating an electronic design automation (EDA) tool to define a software programmable fully pre-laid out macro by laying out a control logic with a fixed topology to obtain a fully pre-laid out control logic;
   operating the EDA tool to define a hardware programmable partially pre-laid out macro by customizing a configurable layout area and mapping a computational logic based on computation kernels for use by an application to obtain a partially pre-laid out computational logic; and
   operating the EDA tool to perform a final customizing step by defining fixed area and fixed connections of the partially pre-laid out computational logic to the fully pre-laid out control logic.

2. The method according to claim 1, wherein defining the software programmable pre-laid out macro comprises laying out synchronization, control, and data routing logic with a fixed topology.

3. The method according to claim 2, wherein the laying out of synchronization, control, and data logic is realized using a register transfer level (RTL) to application specific integrated circuit (ASIC) cell based design flow.

4. The method according to claim 1, further comprising verifying and characterizing design behavior and timing of the pre-laid out control logic.

5. The method according to claim 1, wherein defining the hardware programmable pre-laid out macro comprises mapping generic layout structures on a reserved spatial region.

6. The method according to claim 5, further comprising customizing the pre-laid out computational logic by configuring a restricted set of lithography mask layers.

7. The method according to claim 1, wherein defining the hardware programmable pre-laid out macro further comprises defining an interconnect based upon user input.

8. The method according to claim 1, wherein defining the hardware programmable pre-laid out macro further comprises defining an interconnect based on pre-defined routing patterns customized by at least one of via and metallization instances.

9. The method according to claim 1, wherein defining the software programmable pre-laid out macro includes defining a set of memory buffers to act as a temporary results repository.

10. The method according to claim 1, wherein defining the software programmable pre-laid out macro includes defining a data route from an external source to the DSP accelerator.

11. The method according to claim 10, wherein the data route is a network on a chip.

12. A method of making a digital signal processing (DSP) accelerator comprising:
   operating an electronic design automation (EDA) tool to define a software programmable fully pre-laid out macro by laying out a control logic with a fixed topology to obtain a fully pre laid-out control logic by laying out synchronization, control, and data routing logic with a fixed topology;
   operating the EDA tool to define a hardware programmable partially pre-laid out macro by customizing a configurable layout area and mapping a computational logic based on computation kernels for use by an application to obtain a partially pre-laid out computational logic;
   operating the EDA tool to perform a final customizing step by defining fixed area and fixed connections of the partially pre-laid out computational logic to the fully pre-laid out control logic; and
   verifying and characterizing design behavior and timing of the fully pre-laid out control logic.

13. The method according to claim 12, wherein the laying out of synchronization, control, and data logic is realized using a register transfer level (RTL) to application specific integrated circuit (ASIC) cell based design flow.

14. The method according to claim 12, wherein defining the hardware programmable partially pre-laid out macro comprises mapping generic layout structures on a reserved spatial region.

15. A digital signal processing (DSP) accelerator comprising:
   a software programmable fully pre-laid out control logic;
   a hardware programmable partially pre-laid out computational logic based on computation kernels for use by an application; and
   fixed area and fixed connections coupling the partially pre-laid out computational logic to the fully pre-laid out control logic.

16. The DSP accelerator according to claim 15, wherein the software programmable pre-laid out control logic comprises a general portion including synchronization, control, and data routing logic 17. The DSP accelerator according to claim 15, wherein the hardware programmable pre-laid out computational logic has a fixed area with fixed connections to the fully pre-laid out control logic.

18. The DSP accelerator according to claim 17, wherein the hardware programmable pre-laid out computational logic comprises a generic layout structure on a predetermined spatial region.

19. The DSP accelerator according to claim 15, wherein the hardware programmable pre-laid out computational logic further comprises an interconnection system that is defined based upon user input.

20. The DSP accelerator according to claim 15, wherein the pre-laid out computational logic further comprises an interconnection system that is defined based upon pre-defined routing patterns customized by at least one of a via and a metallization instance.

21. The DSP accelerator according to claim 15, wherein the software programmable pre-laid out control logic includes a set of memory buffers to act as a temporary results repository.

22. The DSP accelerator according to claim 15, wherein the software programmable pre-laid out control logic includes a data route from an external world to the DSP accelerator.

23. The DSP accelerator according to claim 22, wherein the data route includes a network on a chip.

* * * * *